March 30, 1954 W. M. SCOTT, JR Re. 23,811

BUS BAR HOUSING

Original Filed March 25, 1944 8 Sheets-Sheet 1

INVENTOR.
WILLIAM M. SCOTT JR.
BY
Samuel Ostrolenk
ATTORNEY

BUS BAR HOUSING

Original Filed March 25, 1944 8 Sheets-Sheet 2

INVENTOR.
WILLIAM M. SCOTT JR.
BY
Samuel Ostrolenk
ATTORNEY

March 30, 1954 W. M. SCOTT, JR Re. 23,811

BUS BAR HOUSING

Original Filed March 25, 1944 8 Sheets-Sheet 3

INVENTOR.
WILLIAM M. SCOTT JR.

BY

Samuel Ostrolenk
ATTORNEY

March 30, 1954 W. M. SCOTT, JR Re. 23,811

BUS BAR HOUSING

Original Filed March 25, 1944 8 Sheets-Sheet 4

INVENTOR.
WILLIAM M. SCOTT JR.

BY

Samuel Astrolink
ATTORNEY

March 30, 1954 W. M. SCOTT, JR Re. 23,811

BUS BAR HOUSING

Original Filed March 25, 1944 8 Sheets-Sheet 5

INVENTOR.
WILLIAM M. SCOTT JR.

BY

Samuel Astrolink
ATTORNEY

BUS BAR HOUSING

Original Filed March 25, 1944 8 Sheets-Sheet 6

INVENTOR.
WILLIAM M. SCOTT JR.
BY
Samuel Ostrolenk
ATTORNEY

BUS BAR HOUSING

Original Filed March 25, 1944 8 Sheets-Sheet 7

INVENTOR.
WILLIAM M. SCOTT JR.
BY
Samuel Ostrolenk
ATTORNEY

BUS BAR HOUSING

Original Filed March 25, 1944 8 Sheets-Sheet 8

INVENTOR.
WILLIAM M. SCOTT JR.
BY
Samuel Ostrolenk
ATTORNEY

Reissued Mar. 30, 1954

Re. 23,811

UNITED STATES PATENT OFFICE 23,811

BUS BAR HOUSING

William M. Scott, Jr., Bryn Mawr, Pa., assignor to I. T. E. Circuit Breaker Company, Philadelphia, Pa., a corporation of Pennsylvania Original No. 2,469,445, dated May 10, 1949, Serial No. 528,051, March 25, 1944. Application for reissue April 22, 1950, Serial No. 157,619

9 Claims. (Cl. 174—99)

Matter enclosed in heavy brackets [ ] appears in the original patent but forms no part of this reissue specification; matter printed in italics indicates the additions made by reissue.

My present invention which is a continuation-in-part of application Serial No. 462,237, filed October 16, 1942 now Patent No. 2,396,131, issued March 5, 1946, relates to bus bar supporting members and housings, and more particularly to a means for providing a continuous housing for a bus bar whereby the bus bar is supported in appropriate relation to other elements of the system and is fully protected.

My invention is primarily directed to a continuous housing for a bus bar formed essentially of continuous tubes which in one form may be of insulating material supported between spaced structural metallic members. The said structural metallic members are designed with minimum clearance to the conductors so that the continuous housing is protected.

My invention further contemplates the arrangement of the housing support for the bus bar so that a weather-proof continuous housing is provided therefor; while, nevertheless, access may readily be obtained to the interior of the housing to enable removability, cleaning, inspection, or replacement of insulators or other elements after assembly, without interfering with the housing or the bus covering.

Indeed, my invention contemplates the formation of the continuous weather-proof housing in such a manner that inspection may even be possible while power is on.

Heretofore, it has been thought necessary in building circular housings for bus conductors to construct each section of the housing of two matching half-cylindrical members which are then secured together in any appropriate manner.

My invention, by making it possible to utilize continuous tubular members as the housing for the bus conductor, makes it thereby possible to obtain a stronger housing, better able to withstand external blows or electrical stresses, and even internal pressure due to gases formed on short circuits.

My invention also contemplates the utilization of removable means in connection with the structural members which support and space the continuous housing members to permit ventilation and access to the interior of the housing at any time.

In one embodiment of my invention, I utilize non-metallic tubular members between the structural supporting members of my housing, in which case the necessity for insulation at each of the structural members is obviated. The non-metallic housing, which may be of asbestos or any other electrically insulating material, is advantageous in its cheapness, availability, and lightness for strength.

Since it is desired that any flash-over from the bus conductor to the housing be conducted immediately to the metallic supporting ring or other structure, the said metallic ring member is provided with ribs which project inwardly for substantial distances to ensure that the flash-over is to the metallic ring.

In order further to ensure conduction to the metallic ring and other structural support, the insulating tube forming the housing may be provided with a metal coating on its interior, which coating is grounded to the supporting ring to ensure the grounding of any flash-over. Such a metallic coating may, in appropriate cases, be also placed on the outside of the insulating tube or on both sides of the insulating tubes; or may even be incorporated and embedded in the material of the tube itself.

To facilitate manufacture and assembly, the structural metallic rings, which furnish the support and spacing members for the continuous tubes, may each be made in two half-sections which are bolted together; and, in appropriate cases, one-half of the ring may be made of magnetic material and the other half of non-magnetic material.

Accordingly, the primary object of my invention, as expressed in the foregoing, is the formation of a novel continuous housing for a bus conductor.

Another and corollary object is the formation of such a novel continuous housing from a continuous member or tube of insulating material.

Still another object of my invention is the arrangement of the continuous housing in such a manner that an appropriate path is provided for any flash-over to ground so that the housing, as well as the bus conductor, is protected.

These and many other objects of my invention will become apparent in the following description and drawings in which.

Figure 1:
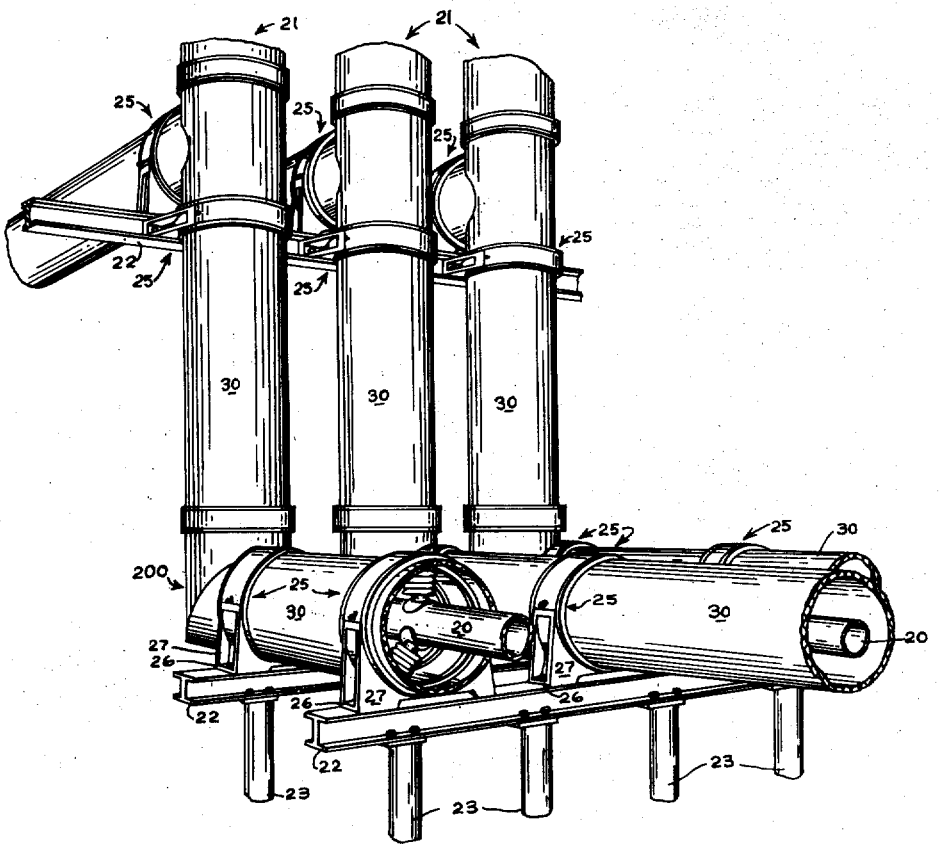
Figure 1 is a view in perspective of a three-phase bus run built in accordance with my invention.

Referring now to Figure 1, I have here shown a three-phase bus system comprising the bus conductors 20 each supported within its own continuous housing 21, 21. The housings are supported from any suitable structural members which, in this case, are shown to be a plurality of I-beams 22, 22, which, in turn, are supported on risers 23, 23.

A metallic supporting ring, 25, preferably of cast bronze, is secured to the I-beam 22 in any suitable manner, preferably by bolts passing through the base 26 of the supporting leg 27 of the metallic supporting member 25 and into the flanges of the I-beams 22.

The supporting rings 25 are spaced apart by distances which are determined by the length of the tubular continuous housings 30 of insulating material which are supported between spaced rings 25.

Accordingly, the I-beams 22 and the supporting structure for the said I-beams are likewise spaced in accordance with the predetermined dimensions of the insulating tubular housings 30.

As will be obvious from Figure 1, the arrangement of the supporting rings 25 and the structural members which support the same are such as to permit appropriate and necessary changes in direction and taps from the bus.

As has been above pointed out, the continuous housing member 30 is a continuous tube of insulating material, preferably of asbestos which is fire-resistant.

Figure 3:
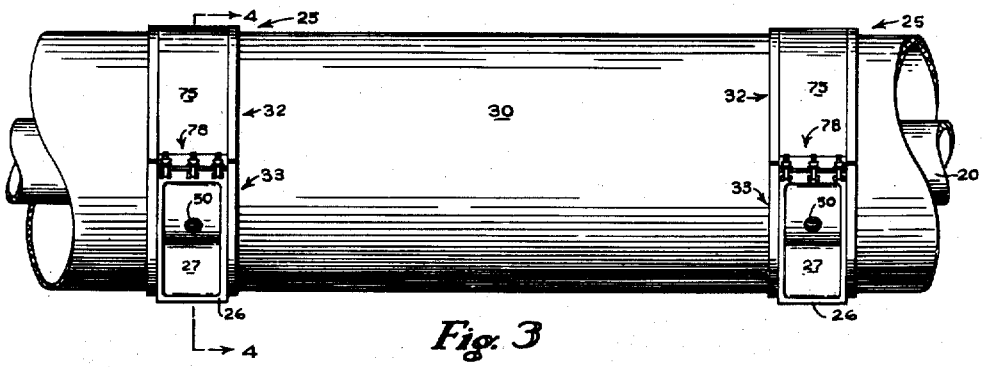
Figure 3 is a side view of a portion of the bus run of Figure 1 showing the relationship between the housing and the supporting rings.

Each link of continuous tubular housing 30, is, as above pointed out, supported between a pair of opposite rings 25. The form of the supporting ring itself may more readily be seen in the side view of Figure 3 and the cross-sectional view of Figure 4 as well as in views of Figures 5 and 6, which figures should be considered together.

The structural ring 25, as shown in these figures, comprises an upper-half section 32 and a lower-half section 33. These half-sections 32 and 33 are formed of metallic castings (preferably bronze) which are bolted together in any appropriate manner. The preferred means for bolting these half-sections together is a centrally disposed lug or ledge 35, 35 (see Figures 4 and 5) at the end of each half-section interposed between the ribs 40.

Figure 4:
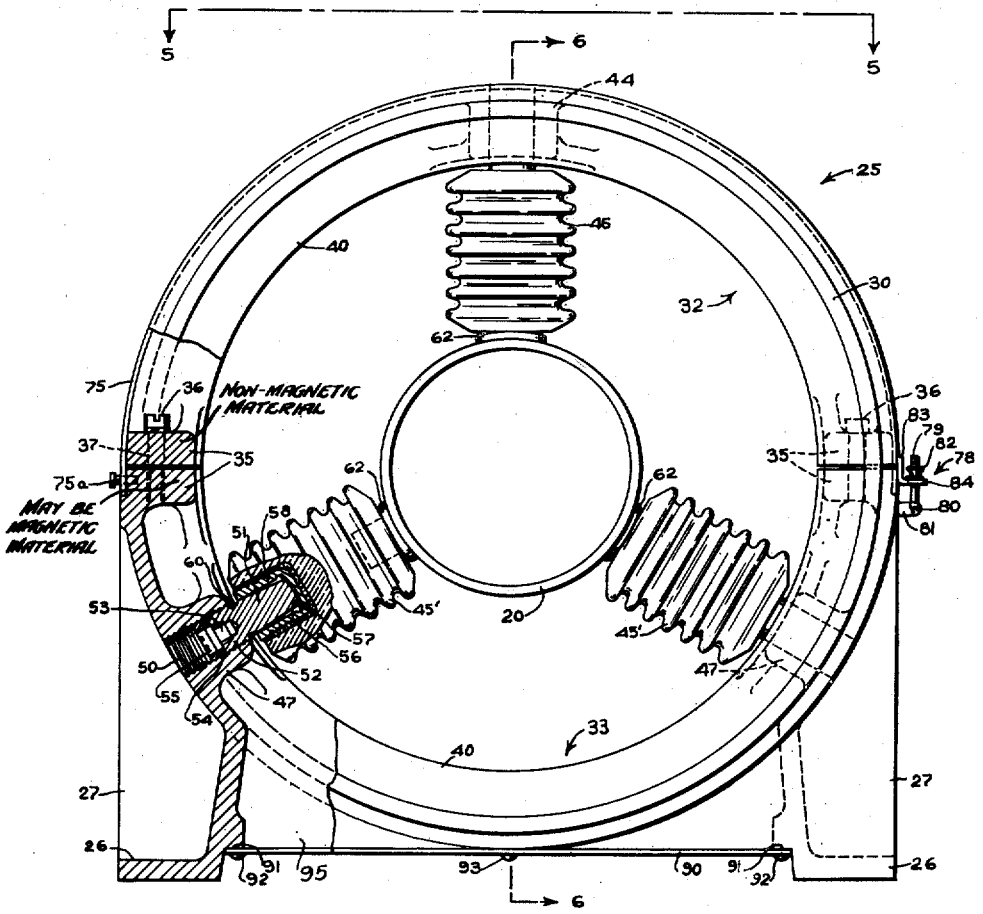
Figure 4 is a cross-sectional view taken on line 4—4 of Figure 3 looking in the direction of the arrows showing the relationship between a circular bus conductor and the supporting rings.

The lugs or ledges 35 match with each other, as shown in Figure 4, and a bolt 36 may be passed through the matching openings 37 to secure the half-sections 32 and 33 together.

Where desired, and where the electrical characteristics of the support make it useful, one of the half-sections of the supporting structural member 35 may be made of magnetic material and the other half-section of bronze or other similar substantially non-magnetic material, for reasons explained hereafter.

Figure 6:
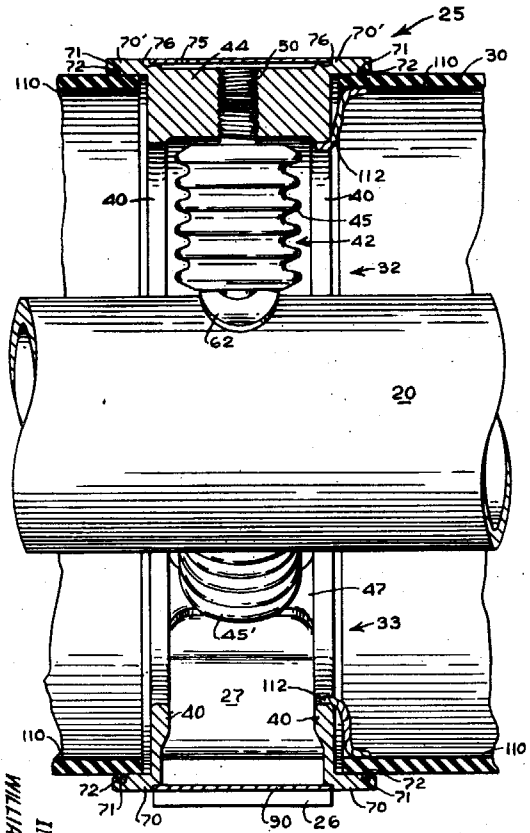
Figure 6 is a cross-sectional view of the supporting ring taken from line 6—6 of Figure 4 looking in the direction of the arrows.

As seen in Figures 4 and 6, each of the structural metallic supporting members 25 is provided with a pair of spaced, parallel, inwardly extending annular supporting ribs 40, 40 for purposes hereinafter more specifically set forth.

Figure 5:
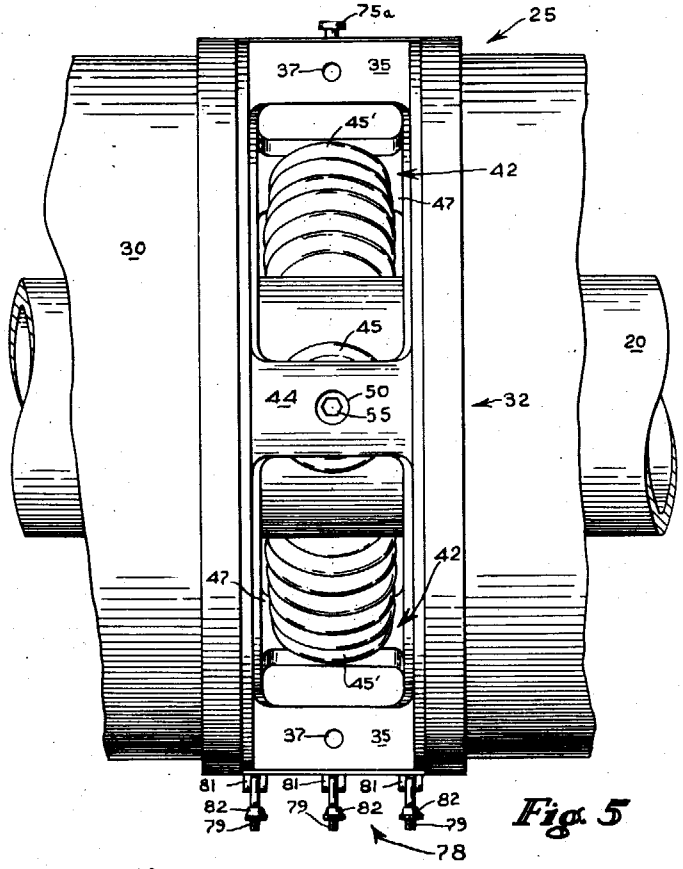
Figure 5 is a top view of one of the supporting rings taken from line 5—5 of Figure 4 looking in the direction of the arrows.

As is also seen in Figure 5, at least the upper half section 32 is cut out to provide hand-holes 42, 42 to afford ready access to the interior of the housing even after the same has been completely assembled.

Likewise, as is seen in Figures 4, 5, and 6, the upper central section of the half-section 32 of housing 25 has a solid continuous section 44 interconnecting the opposite sides of the half-section 32 and providing a supporting means for the insulator 45. The lower half-section 33 is also provided with heavier connecting portions 47 between the ribs, in order also to provide for appropriate support of the lower insulators 45', 45'.

It will be obvious, of course, that the upper half section 32 may be arranged so that two insulators 45 are spaced 90° from each other, and the lower insulators 45′ may also be spaced 90° from each other to provide for the utilization of four insulator supports rather than three as here shown. The number of supports which will be used is, of course, dependent on the particular structural and electrical conditions to be encountered.

In the ordinary case where the bus run is horizontal, it may be sufficient to provide for two lower insulator supports 45′ and but one upper spacing and supporting insulator 45. Where the bus run is vertical, or under other special conditions, it may be desirable to have four equally spaced insulators in order to provide for appropriate support.

The insulators 45 and 45′ are preferably supported in the structural member 25 in the manner described in my Patent No. 2,396,131. That is, each of the elements 44 and 47 is provided with a threaded opening 50 into which an insulator supporting stud 51, having a threaded end 52, may be threaded. The threaded end of the stud 51 is provided with a hexagonal bore 53 to facilitate screwing the same into the opening 50.

After the stud 51 is in position, lock washer 54, having a hexagonal opening, is screwed into the opening 50, and a lock nut 55, having a similar hexagonal bore, is screwed into the opening 50 thereby pulling the lock washer 54 up tight against the end of the stud 51 and thus locking the stud 51 in the selected position.

The stud 51 is slightly frustrum-conical in shape and has an end 56 which is a section of a sphere. The end 56 bears against the correspondingly shaped inner surface 57 in a metallic socket 58 embedded in the insulator 45 or 45′.

The section 60 of the stud 51 adjacent the open end of the socket 58 is rounded so that the stud 51 in the socket 58, and hence the insulator 45 or 45′, may have relative movement with respect to each other.

The saddle 62 at the opposite end of the insulator which engages the bus conductor 20 is preferably transversely arced, as described in my above-mentioned patent, in order to provide for a line contact between the said saddle and the bus conductor 20 to permit the insulator 45 or 45′ to tip slightly in accordance with any movement of the bus conductor 20 with respect to the structural supporting member 25. This, too, follows the principles specifically described as set forth in my above mentioned application.

Figure 11:
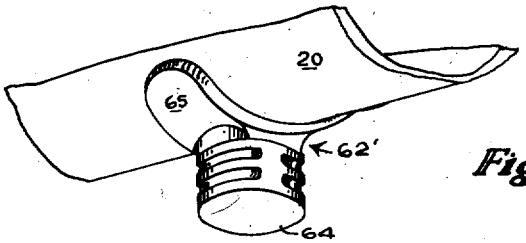
Figure 11 is a fragmentary view in perspective of a preferred form of saddle for supporting the bus conductor, the said saddle of course being secured to the end of an insulator.

As shown in Figure 11, the preferred form of saddle 62′ is that which has a shank 64 embedded in the end of the insulator in any suitable manner and a bus supporting portion 65 which is curved to engage the bus conductor 20, but which is transversely arced on its supporting surface so that the saddle engages the bus conductor 20 only over a single tangential line. The saddle and hence the insulator may therefore rock with respect to the bus conductor 20, as bus 20 undergoes a slight movement owing to electrical or thermal stresses.

All of these principles involving the rocking of the insulator 45 with respect to the support for the said insulator and with respect to the bus conductor have been specifically described in my aforesaid Patent No. 2,396,131 and reference is made to said application for elaboration of the said principles.

By permitting this rocking movement to occur, uneven stresses on the ceramic of the insulator are avoided as shown in my aforesaid patent: the rocking of the insulator does not diminish the support since the transversely arcuate portion of the saddle is curved on an arc having a center at the pivot of the insulator, and the pivoting members are metallic inserts in the ceramic of the insulator.

As shown more specifically in Figure 6, each of the supporting rings 25 has a lateral annular flange extension 70 on each side to provide appropriate supporting means for the continuous insulating housing tube 30.

Each of the annular flange extensions 70 is provided with a recess or groove 71 to receive a continuous gasket 72 in order to provide a weather-proof seal between the end of the insulating housing tube 30 and the flange 70.

As will now readily be seen, during assembly of the housing as a whole, the lower half 33 of each supporting metallic structure 25 is secured by means of the integral legs 27 to the basic supporting structure or I-beams 22.

The lower insulating supports 45′, 45′ are supported by their respective studs which, in turn, are supported in the respective tapped openings 50. The bus conductor 20 is then laid down on the lower insulators 45′ and rests thereon. The continuous tubular housings 30 are then laid in position between the lower halves 33 of the structural supporting members 25 so that the ends thereof rest on the lower annular flanges 70 of the lower half section 33.

When the continuous tubular insulating housings 30 are appropriately placed in position, then the upper half section 32 is placed in position over the ends of the tubular housings 30 and over the lower half-section 33. The upper surfaces of the ends of the housings 30 are received within the annular flange extension 70′ of the upper half section 32. The upper half sections 32 are then bolted to the lower half sections 33 by means of the bolts 36, as previously described, through the handholes 42 in the upper half section 32; and then insulator 45 is placed in position and is appropriately adjusted on its stud so that it furnishes a spacing and support between the upper portion of the structural ring 25 and the bus conductor 20.

The bus conductor 20 is inspected through the hand-holes 42 and appropriate adjustments of all of the studs 51 of all of the insulators 45 and 45′ are made until the bus conductor 20 is appropriately positioned by the insulators 45 and 45′.

Now, the only openings leading to the interior of the housing are the hand-holes 42. These hand-holes may now be closed by a flexible strip which covers the same. The flexible metallic strip is indicated at 75 in Figures 3, 4 and 6.

The flexible metallic strip 75 is secured by means of the studs 75a to the external portion of the lug 35 at the left-hand side of the lower half section 33 of the structural member 25 (see Figure 4). Although (as shown in Figure 5), only one such bolt 75a is shown, any appropriate number of such bolts may be used in order to obtain proper securement.

The upper half section 32 of the structural supporting member 25 is provided with a pair of opposite spaced ledges 76, 76 in order to support the flexible metallic band 75.

The flexible metallic band is of a sufficient length to wrap around the whole of the upper section 32 and is secured on the right-hand side by means of the clamping units 78. The flexible metallic band 75 thus covers the hand-holes 42, 42.

The clamping units 78 each consists of a bolt 79 pivotally connected by means of the pin 80 to a lug 81 extending outwardly from the upper right-hand side (Fig. 4) of the lower half section 33 of the supporting ring 25. The bolt 79 has an adjustable clamping nut 82 threaded thereon. It is also drilled with a hole 85 to receive a lock, thus preventing unauthorized persons from removing the metallic band.

Figure 8:
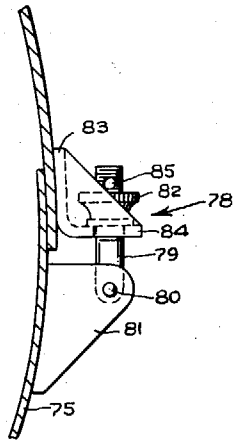
Figure 8 is a fragmentary enlarged view of the righthand portion of Figure 4 showing the method by which the cover member for the hand-holes in the supporting ring is secured in position.

An angle bracket 83 is secured in any suitable manner, as for instance, by welding or brazing, to the free end of the flexible covering strip 75. The said angle bracket 83 has a plurality of open ended slots 84 in the unsecured leg thereof into each of which a bolt 79 may be swung, as shown in Figure 8.

When the bolt 79 has been rotated upwardly and swung into the appropriate slot of the angle bracket 83, the clamping nut 82 may be tightened down on the bolt 79 to draw the flexible metallic covering strip down tight. A sufficient number of clamping units 78 should be used to ensure proper and even closing tension on the flexible metallic strip 75. In appropriate cases, and where it is necessary, the lower half section 33 may be provided with ventilating holes on the underside thereof. However, in order to prevent direct entry of foreign material into these ventilating holes, a lower covering band 90 (Figures 4 and 6) may be secured by means of bolts between the ledges 91, 91 on opposite legs 27 and by means of bolts 92 passing through the covering strip 90 into the ledges 91.

Additional bolts 93 may also be passed through the center of the lower covering strip 90 into the lowest portion of the lower half section 33 of the supporting ring 25. By this means, a slight tortuous path is provided for the entry of the air into any ventilating hole which may be provided in the lower half section 33: that is, the air will first enter laterally into the spaces 95 (Figure 4) and then vertically into the interior of the housing.

Figure 7:
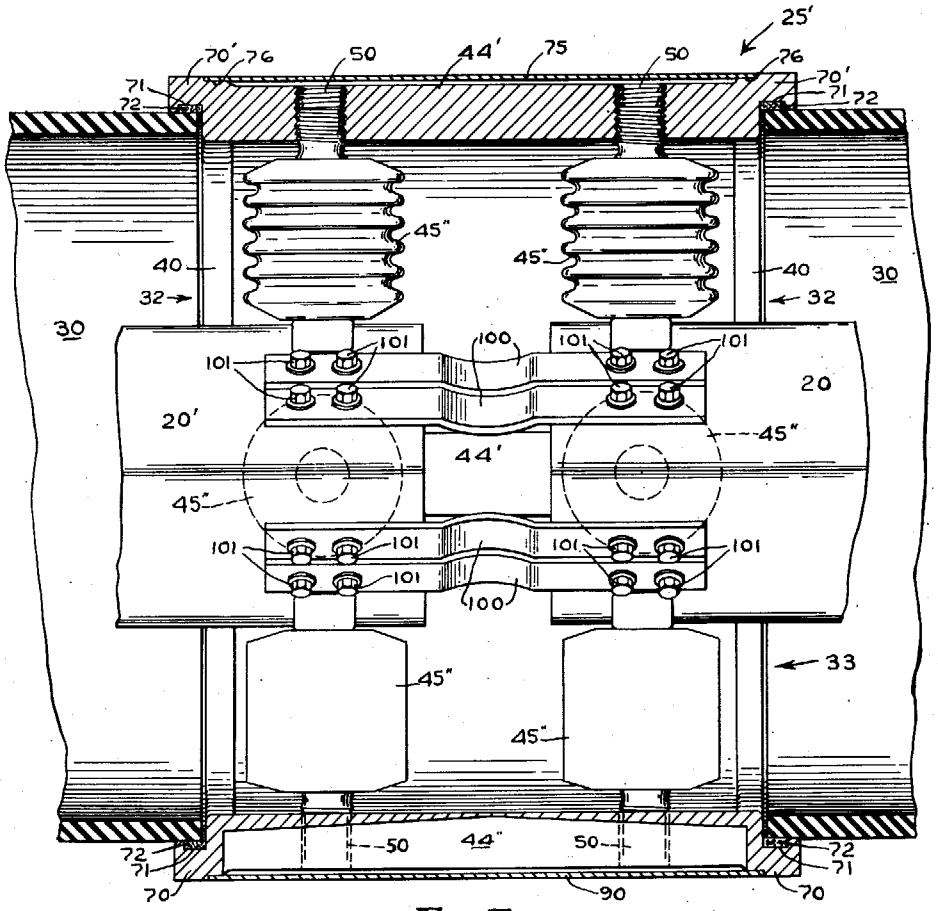
Figure 7 is a cross-sectional view corresponding somewhat to the cross-sectional view of Figure 6 showing, however, the formation of a ring within which two bus conductors are joined end to end.

In Figure 7, I have shown partly in cross-section the kind of supporting ring which may preferably be used where a joint or connection between two adjacent bus runs is to be made. In this case, the ring 25′ (Figure 7) has all of the structural and other characteristics of the supporting ring 25 of Figures 4, 5 and 6, except that it is double in width and is provided with two spaced sets of tapped openings 50 in the supporting portions 44′ for positioning and adjusting the two sets of insulators 45″.

In this case, the buses 20′ are for purpose of illustration shown as square buses, and the insulators 45″ have exactly the structure described in my Patent No. 2,396,131 above referred to.

An expansion joint connection between the two adjacent bus runs 20′ is provided by the flexible conductors 100 which are secured in any suitable manner, as for instance, by the bolts 101, to the adjacent ends of the buses 20′. The spacing of the ends of the bus conductors 20′ permits appropriate expansion and contraction or other movement of the buses with respect to each other, pursuant to electrical and thermal stresses. As pointed out in the above-mentioned Patent No. 2,396,131, the center of each bus run is preferably the portion thereof which is anchored so that the full expansion of the bus from the center out to either end will result in a smaller expansion than if one end were anchored. Consequently, the free ends of the buses have relative movement with respect to the supporting structure and the adjacent ends of the adjacent buses. The flexible connection 100 and the double supporting structure, by means of the two sets of insulators 45″ in the widened supporting ring 25′, permit this action to occur.

Except for the parts above more specifically described, all of the other parts of the supporting ring 25′ correspond to the similar parts of the supporting ring 25 of Figures 4, 5 and 6, and the same reference numbers have been applied thereto.

Figure 16:
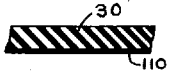
Figure 16 is a fragmentary view of the wall of the continuous insulating housing member showing a metallic coating on the interior of the housing.

As shown in Figure 16, the interior of the insulating tube 30 may have a metallic lamination 110 secured thereto in any suitable fashion, as, for instance, by spraying a finely divided metal with a suitable binder thereon in sufficient thickness to render the said coating 110 fully conductive.

As shown in Figures 16 and 6, such an interior coating 110 will serve to conduct any possible short circuits which fail to flash over to the rib 40 of the supporting metallic structure 25.

A pigtail connection 112 may be secured in any suitable manner, as, for instance, by brazing, between the inner metallic coating 110 and the rib 40 in order to ensure a complete by-pass of any short circuit or flash-over which may extend from the bus 20 to the inner coating 110.

Figure 17:
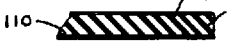
Figure 17 is a fragmentary view of the wall of the continuous insulating housing member showing a metallic coating on both sides of the housing.

In appropriate cases, and where it may be desired, in order to procure the best results, not only may an inner metallic coating 110 be used, but, as seen in Figure 17, an outer metallic coating 115 may also be applied to the surface of the insulating housing 30.

Figure 15:
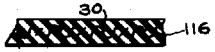
Figure 15 is a fragmentary cross-sectional view of the wall of the continuous insulating housing member showing a metallic mesh embedded therein.

In appropriate cases, where it may be desired not only for electrical purposes but also for additional structural support, a metallic mesh or other similar substantially continuous metallic layer 116 (Figure 15) may be embedded in the tubular insulating housing 30.

It is, of course, clear, as above pointed out, that whenever such metallic linings or laminations are used, they must be grounded by a suitable connection to the metallic ring 25. As above pointed out, one-half of the supporting ring 25 may be of magnetic material and the other half of non-magnetic material.

Figure 2:
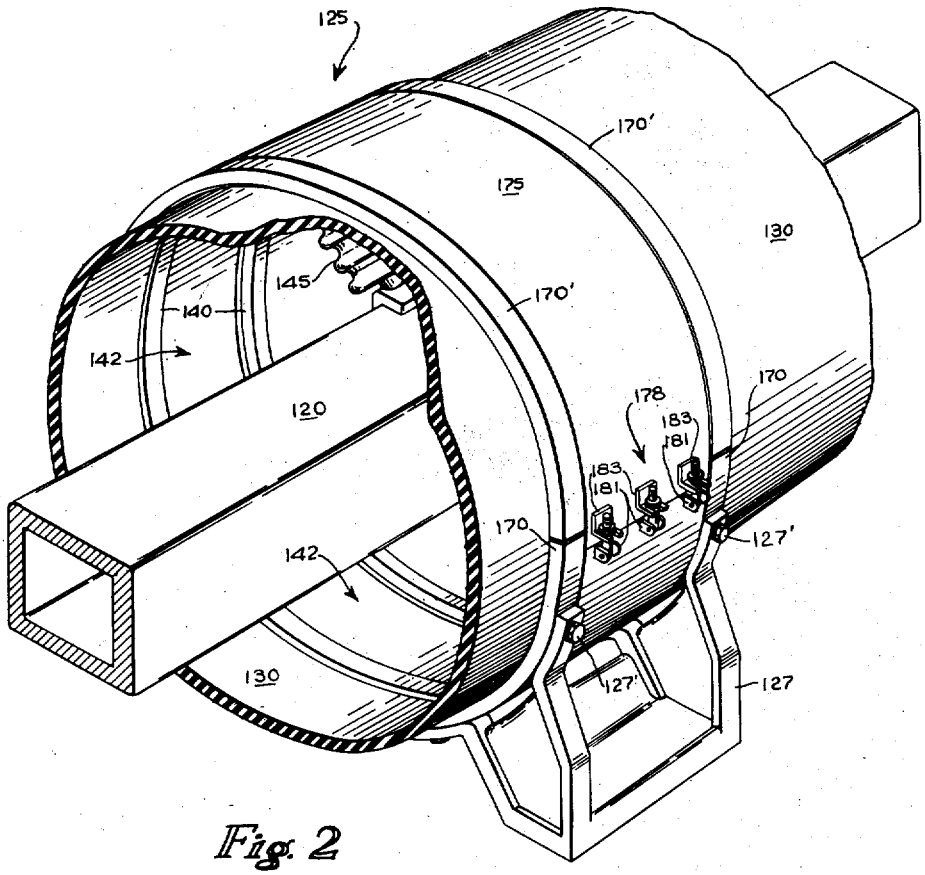
Figure 2 is a fragmentary view in perspective showing a structural ring of a slightly modified form which supports and spaces the bus conductor and likewise supports and spaces the continuous tubular housing. The bus conductor here shown is a square conductor.
Figure 9:
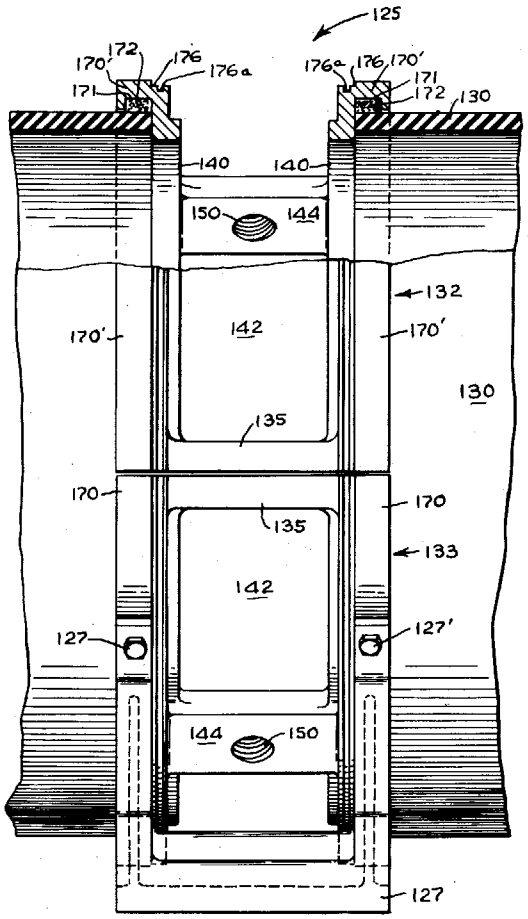
Figure 9 is a side view of a slightly modified form of supporting ring for the continuous housing.
Figure 10:
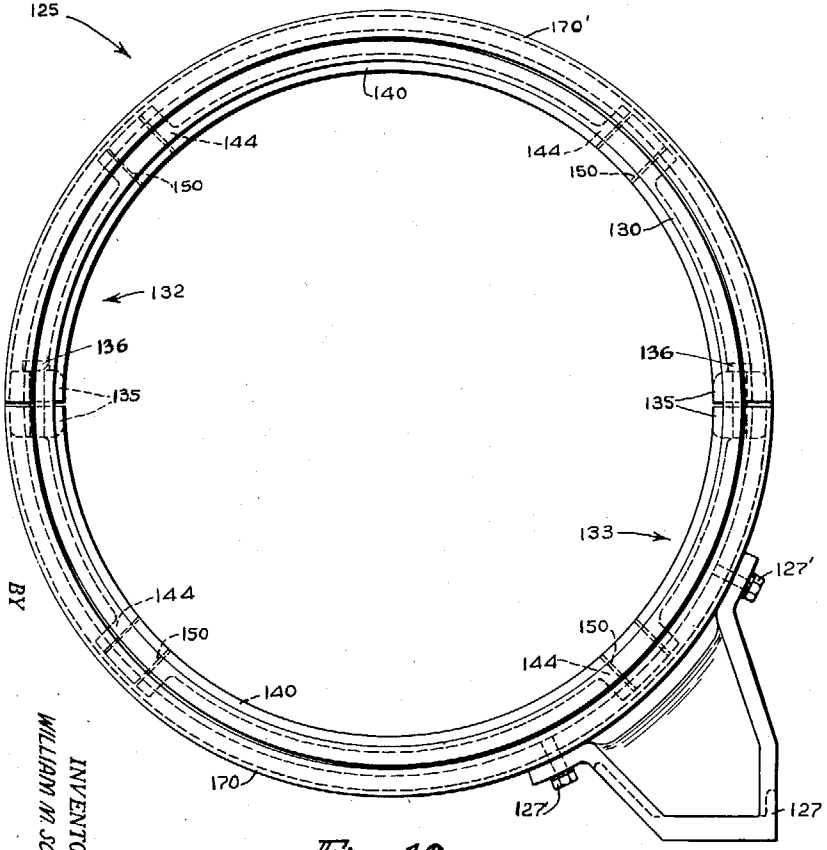
Figure 10 is an end view of the ring of Figure 9.

In Figures 2, 9, and 10 I have shown a modified form of metallic ring support 125 for the bus 120. The bus is here shown as a square bus; although this same type of metallic ring support 125 may be utilized in connection with any other kind of bus.

The structural supporting ring 125 of Figures 2, 9 and 10 is provided with inner annular ribs 140 for purposes previously described, and with outwardly extending flanges 170′ and 170 which correspond respectively to the flanges 70′ and 70 of the supporting ring of Figures 4, 5 and 6. These annular outwardly extending flanges 170′ and 170 are provided with an annular groove 171 to receive the gasket 172 to form a weather-tight seal between the supporting ring 125 and the continuous housing 130.

The opposite flanges and rib rings 140—170 are interconnected at spaced intervals by the supporting members 144, which are each provided with the tapped openings 150 to receive the appropriate stud which will support the insulator 145 so that it will properly position the bus 120. The insulator 145 in this case has the same structure and operation as that described in connection with my aforesaid Patent No. 2,396,131.

The upper half 132 of the composite ring 125 is secured to the lower half 133 of the composite ring 125 by means of bolts 136 passing through the corresponding abutments or ledges 135.

The legs 127 are secured in any suitable manner to the outside surfaces of the annular flanges 170 as, for instance, by bolts 127'.

Complete hand-holes 142, 142 are provided, as seen in Figure 9, and Figure 2 in both the upper half 132 and the lower half 133 of the structural supporting ring 125.

A fully encircling flexible metallic strip 175 is supported on the ledges 176. This flexible metallic strip 175 (in contrast to the flexible metallic strip 75) fully encircles the whole ring.

Clamping units 178, similar to the clamping units 78 shown in Figure 8, are used to tie together opposite ends of the flexible metallic covering band 175.

In this case, however, the angle brackets 183 (which correspond to the angle brackets 83 of Figure 8) are secured to one end of the band; and the opposite bolts and nuts supported by the lug 181 are secured to the other end of the band. By this means, therefore, all of the hand-holes 142 are fully closed up after the structure is assembled.

The annular ledges 176 may be provided with a corresponding annular groove 176a to receive an appropriate gasket to form a weather-tight seal.

In all other respects, the structural supporting ring 125 of Figures 2, 9 and 10 corresponds to the structural supporting ring 25 of Figures 4, 5 and 6.

The assembly of the units, including the structural supporting ring 125, is the same as that with respect to the units including the structural supporting ring 25. That is, the lower half 133 is secured in position on the supporting framework, the bus is mounted in position, the insulating tube 130 is mounted in position in the manner described for tube 30 of Figure 4, the upper half 132 of the structural supporting ring 125 is secured in position, appropriate adjustments are made through the hand-holes 142, and the flexible metallic strip or band 175 is then secured.

Once the flexible metallic strip or band 175 is in position as an all-over cover and located in place, the insulators cannot be moved or adjusted, and there is no access to any part.

In appropriate cases, the flexible metallic strips or bands 175 may be provided with perforations for ventilation; and, since the bands may be moved with respect to the ring and placed thereon with the locking members 178 in any position, the ventilating perforations in the band 175 may be positioned wherever desired to permit ventilation and prevent undue exposure.

Figure 12:
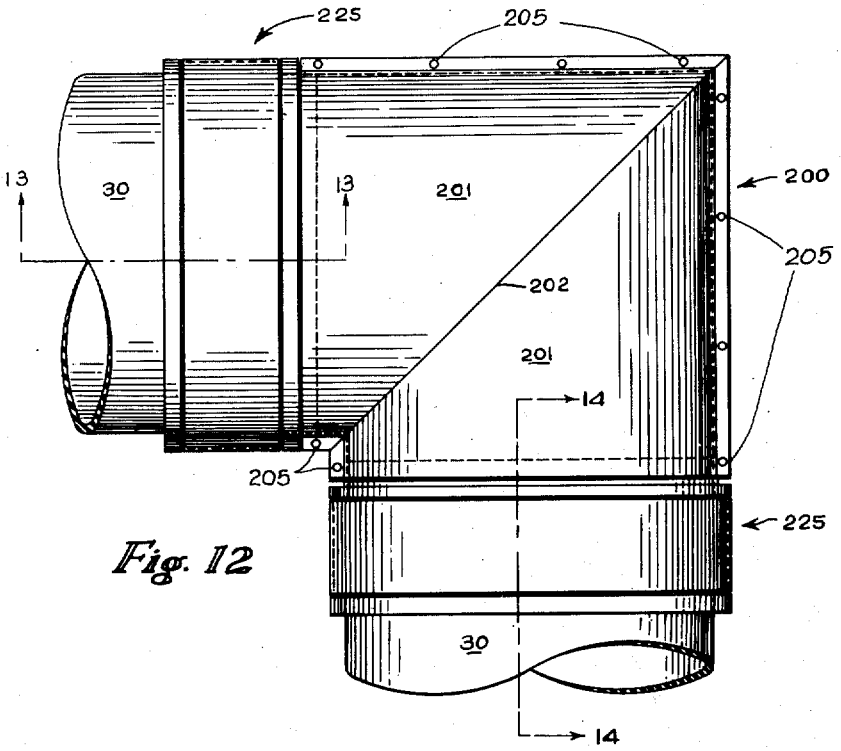
Figure 12 is a fragmentary view of a corner joint for the housing of Figure 1.

Referring now to Figure 12, I have here shown an enlarged view of the corner piece 200 of the bus housing of Figure 1.

The corner piece 200 consists of four metal sections 201, 201 and 201', 201'. Sections 201' lie directly beneath sections 201.

The abutting end of the sections 201, 201 and 201', 201' are cut at a 45° angle so that they may abut each other along the seam 202. The seam 202 is closed in any suitable manner in order to preserve the weather-proofness and continuity of the entire housing. The sections are thus formed into an upper and lower half and fastened together by bolts 205.

Figure 14:
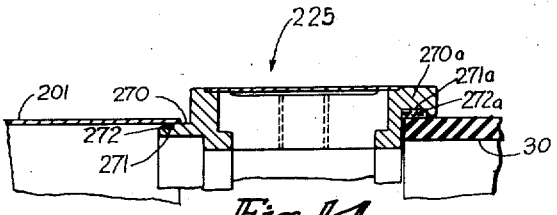
Figure 14 is a fragmentary cross-sectional view taken on line 14—14 of Fig. 12 looking in the direction of the arrows showing a modified arrangement for a ring whereby the opposite sides of the ring have different formations to facilitate the support of different sizes and thicknesses of housings and to position the housings in different ways.

The supporting rings 225, 225 on each side of the corner piece 200 correspond to the supporting rings 25 of Figures 4, 5 and 6 in every respect, with the sole exception that the annular flanges 270 (see Figure 14) and 270a have different shapes. The annular flange 270a which is to receive the end of the continuous tube 30, as shown in Figure 14, corresponds to the annular flange 70 of Figure 6 and is provided with an annular groove 271a and annular gasket 272a, which are slightly wider than annular groove 71 and annular gasket 72.

An annular groove 271 is provided on the outside surface of the annular flange 270, and a gasket 272 is positioned in the said groove on the outside surface of the annular flange 270 to bear against the end of the section 201. The end of tube 201 thus surrounds the annular flange 270.

Figure 13:
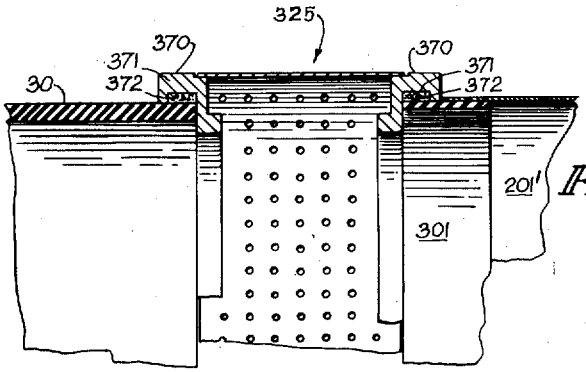
Figure 13 is a fragmentary cross-sectional view taken on the line 13—13 of Figure 12, looking in the direction of the arrows, showing the manner in which a single supporting ring member may be utilized without modification to support housings of different thicknesses on opposite sides.

Some of the shapes as for instance elbows and T's cannot be made in insulating materials as they can in metals (Figs. 12 and 13 are shown to indicate one of the supporting structures adapted for insulating material on one side and a metal enclosure on the other side).

In Figure 13 I have shown a modified method of receiving and supporting the corner piece which utilizes a supporting ring 325, which is in every respect similar to the ring 25 of Figures 4, 5 and 6, except that the annular grooves 371 in the annular flanges 370 are wider and receive a wider gasket 372.

The ring of Figure 13 differs from the ring of Figure 14, first, by reason of the fact that opposite sides of the ring 325 of Figure 13 are the same, and second, by reason of the fact that the end of tube 201 of the corner piece 200 is received on an extension piece 301, fitting the interior of the flange 370.

In Figure 13, the ring 325 is so arranged, however, that the flange 370 on one side, which will properly receive the end of the tube 30, will define a circle slightly smaller than the outside diameter of the corner piece 200 on the other side. Therefore, as seen in the right-hand side of Figure 13, an insert sleeve 301 is provided having an outside diameter which will just fit inside the flange 370 and be made weather-tight by the gasket 372 and which will fit just inside the corner piece 200 which, in this case, extends up to the outside lateral edge of the flange 370.

The extension tube 301 is preferably secured into the corner-piece 200, as shown in Figure 13, in such manner that a weather-tight seal is formed between the corner-piece 200 and the insert sleeve 301.

Figure 18:
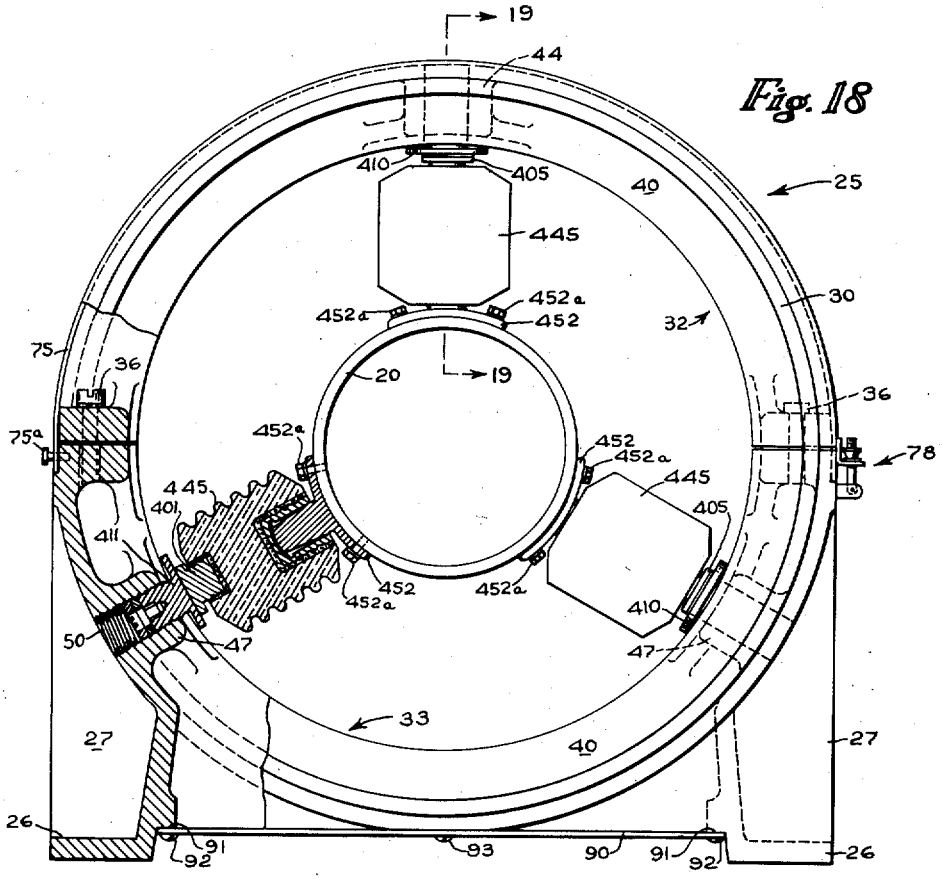
Figure 18 is a cross-sectional view corresponding substantially to the cross-sectional view of Figure 4 but showing a modified form of insulator support for the bus conductor within the housing.
Figure 19:
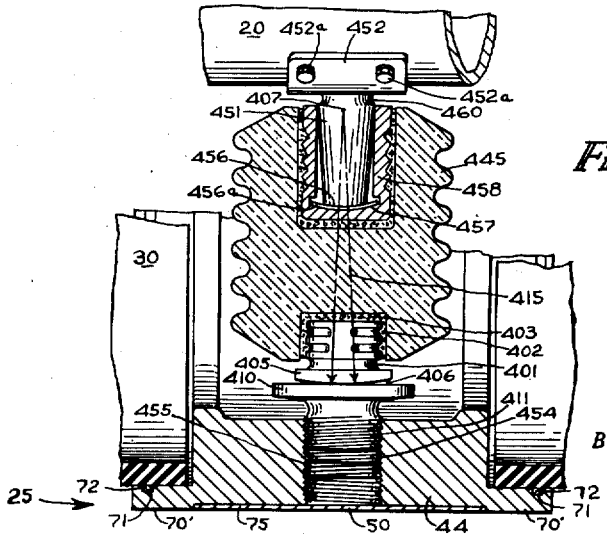
Figure 19 is an enlarged cross-sectional view of the insulator support of Figure 18.

In Figures 18 and 19, I have shown a structural supporting ring 25 corresponding exactly in every respect to the structural supporting ring 25 of Figures 4, 5 and 6, but I have here shown a supporting insulator 445 of modified form. In Fig. 4, as well as in the other figures thus far described in connection with those figures, the insulator pivots around a stud 51 carried by the housing and is provided with a saddle for supporting the bus wherein the saddle has a transversely arcuate section. Thus, the insulator may pivot with respect to its support on the ring 25 and rock on the arcuate saddle surface with respect to the bus.

In Figures 18 and 19, the reverse operation is shown wherein the insulator pivots around a stud secured to the bus and rocks on an arcuate surface with respect to a supporting member on the structural supporting ring 25.

Thus, as shown in Figures 18 and 19, a stud 451 is provided with a saddle 452 which is secured in any suitable manner as for instance, by bolts 452a to the bus 20. The stud 451 is thus absolutely stationary with respect to the bus 20.

The insulator 445 is provided with a metallic insert 458 having a base 457 which is a section of a sphere. The end of the conical stud 451 also has a surface 456 which is a section of a sphere.

A washer 456a is provided between the end 456 of the stud and the surface 457 of the socket 458.

The stud 451 is provided with rounded shoulders 460 so that the socket 458, and hence the entire insulator 445, may rock against the stud 451.

Thus, the action of the insulator 445 around the stud 451 of Figures 18 and 19 is exactly the same as that of the insulator 45' of Figure 4 about its stud 51, and the rocking action is also that described in connection with similar members in my above-mentioned Patent No. 2,396,131.

The end of the insulator 445 opposite the bus is provided with a metallic extension 401 secured by cement or other suitable material 402 in the end 403 of the said insulator 455.

A metallic extension 401 of the insulator 445 is provided at its end with a head 405 having a surface 406 which is part of a sphere.

The spherical surface 406 has a radius extending from the (imaginary) pivot point 407 of the insulator 445 as a whole: that is, when the insulator rocks about the stud 451, the pivot is approximately at the point 407, and in order to obtain a point contact between the spherical head 405 and the substantially flat surface 410 on the end of the stud 411, which is secured to the supporting ring 25, the spherical surface 406 is formed on the center 407. Similarly, in order to ensure appropriate rocking action of the insulator 445, the spherical surfaces 456 and 457 have the point 407 as a center.

The stud 411 is secured in the tapped opening 50 of the supporting ring 25 by a threaded run from the interior. When it is appropriately positioned, it is locked in position by the washer 454 and the lock nut 455. The stud 411 is adjusted inwardly so that when the insulator 445 is perpendicular to the bus 20 and the surface 410, a tight fit is obtained.

Since the insulator 445 as a whole rocks about the point 407, and the radius 415 from the point 407 to the surface 406 is always the same, the same tight adjustment will be maintained between the surface 410 and the head 405 of stud 401 irrespective of the angular position which the insulator 445 may assume with respect to the head 410 of stud 411 and with respect to the access of the bus 20.

Thus, should the bus 20 expand or contract or have other movement due to electrical or thermal stresses, the ceramic portion of the insulator 445 will not be sheared or cracked by this movement, but the insulator 445 may rock freely with respect to the bus 20 and the opposite support to permit automatic adjustment of the position of the bus 20. For this purpose, therefore, the principles previously described in my Patent No. 2,396,131 are followed.

The difference between the present structure described in Figures 18 and 19 and those described in the aforesaid application is that the insulator rocks about a pivot which is secured to the bus, rather than a pivot which is secured to the supporting structure, and has a tangential or point contact with a portion of the supporting structure rather than with a portion of the bus. Otherwise, the underlying principles are still the same.

I have found that, for proper operation, the surface 410 of the stationary stud 411 may be perfectly flat.

There should be a high coefficient of friction between surfaces 406 and 410 to ensure that surface 406 will rock with respect to surface 410 and not slide with respect thereto. For this purpose, either of the surfaces may be roughened slightly.

My invention enables the removal, cleaning, inspection, or replacement of the insulators through the hand-holes after assembly and without interfering with the housing or bus covering. Such operations involve only the removal of a relatively slight cover over a portion of the structural member itself.

The housing is made as a continuous tube rather than in sections; thus making the housing stronger than a housing constructed of part cylindrical members as was done in the prior art. The housing may thus better withstand external blows or electrical stresses or internal pressures due to gases formed on short circuits. The continuous housing also lends itself readily to outside construction because it is weather-tight; the utilization of appropriate gaskets over the hand-holes will ensure a complete weather-tight construction.

Inspection of the bus structure and insulators is possible while power is on, because only relatively small cover pieces over the structural supporting member need be removed for such inspection.

The supporting rings or structural members are provided with ribs which ensure minimum clearance between structural members and the bus conductors, so that any flash-over which is formed may be to the metallic structural ring which is grounded.

Since the asbestos material to the tubular housing member is semi-conductive, any flash-over to the said tubular member may be readily conducted to the metallic structural member and grounded. As above pointed out, in order to ensure such conduction of any flash-over to the tubular member to the metallic supporting structure, metallic laminations may be applied as a surfacing material to the interior surface of the asbestos tubular member. In appropriate cases, the outside surface may be also laminated with metal and, as above pointed out, in appropriate cases, a metallic mesh or other material may be incorporated within the housing itself. The metal, as above pointed out, may be sprayed on with a suitable binder to hold the same in place. I have found that an asbestos metallic coating sufficiently serves the purpose.

Since the housing 30 itself is essentially non-metallic, the necessity for insulation at each structural supporting ring is obviated.

The non-metallic housing formed of asbestos or other suitable material is advantageous in its cheapness, its commercial availability, and lightness of weight. Further, since asbestos is fire-resistant, a real hazard in bus structures is eliminated.

The metallic supporting structures herein described may be utilized as readily with three or four insulators or any other suitable number which may be required in any appropriate case.

Appropriate ventilation may be provided by the utilization of protected openings in the structural supporting members. Ventilating openings may be provided either in the lower half section of the structural supporting member with an appropriate cover or baffle 90 over the openings to provide a tortuous path for the air; or perforations may be provided in the covering band of the structure shown in Figures 2, 9 and 10, and the covering band may be turned to a position where the openings or perforations are protected.

Once the covering band is in place and located, the insulators cannot be moved or adjusted, and there is no access to any part.

Since the structural supporting rings are in half-sections, one half of the ring may be made of magnetic material and the other half of non-magnetic material.

Under normal conditions with current flowing in the bus bar it is surrounded by a magnetic field. Any iron which is present in this magnetic field will have magnetic lines of force set up in it which in turn induce eddy currents and they in turn heat the iron and increase its temperature. This is particularly true if the magnetic material surrounds the bus bar so as to form a continuous path for the magnetic field surrounding the bus. When the supporting structure is made with both halves of magnetic material this forms a complete path for the magnetic field and magnetic flux circulates in it. With current in the bus of say 800 amperes, this heating is not great enough to exceed commercial limit. If, however, the current in the bus should increase to say 1200 amperes, this heating would become excessive.

In order to avoid overheating, the supporting frame is made with one-half non-magnetic material which breaks up the circular path and limits the flux to a point where even the remaining half which is made of magnetic material does not overheat. In addition, if the bus is carrying a much higher current such as 4000 amperes, it may be that field intensity is so great that any magnet would overheat and it is necessary to make the whole ring of non-magnetic material. Thus it will be seen that when the supporting frame is made in two halves quite a variety of conditions can be met without overheating and at the same time using the least expensive material.

In the above, I have described my tubular structure as made of insulation material. In another embodiment of the invention, I employ a metallic tubular structure. Where the tubular enclosing member is made of metal which is magnetic, this heating phenomenon also appears in it. Rolled material heats very much more than a cast material in the range of currents usually applied with this bus construction. In such cases, I employ brass or copper.

There are also currents induced in this tube when made of metal, which run lengthwise in the tube similar to the sheath currents in a lead-covered cable. When the enclosing tube is made of metal or is made of insulating material such as asbestos and has provided either an inside or outside metal coating, it is desirable to ground this coating only at one end and to leave a small gap between the coating and the supporting frame at the other end so as to provide no circuit for these currents.

The use of an enclosed bus of this kind very largely eliminates any possibility of a flash from the bus to ground. This is because the type construction eliminates dirt, keeps out animals and even if ionized gas were present due to an adjacent fault the tight enclosure protects the insulating value of the air within the enclosure and faults of this kind are avoided. It might happen, however, that the high voltage surges caused by switching or by lightning might increase the voltage of the bus to the point where the insulation through the air would break down. Should this occur, provisions are made in the design to quickly conduct this flash over to ground at points where the minimum destruction would occur. To this end the supporting casing has ribs that stand out higher than the rest of the grounded material so as to form the arcing point and to quickly cause a flash to ground which would excite the circuit breakers on the line which will open and clear the fault with a minimum of destructions.

For safety of operators and anyone who might come in contact with the bus run, the supporting frame is connected by a copper ground bus to the station ground. If the continuous tube, surrounding the bus, is made of metal, it too should be grounded at one end leaving a gap at the other end so that circulating currents will not occur. If, however, the continuous tube is made of insulating material either on the inside or on the outside, it may be coated with metal and that metal grounded at one end to provide ground potential wherever the tubing might be touched on the outside, otherwise a high resistance to ground might result in a potential gradient, a high enough potential to shock anyone who came in contact with it.

In the foregoing I have described my invention only in connection with preferred embodiments and preferred uses and applications thereof. Many other embodiments and applications of my invention should now be obvious to those skilled in the art. Accordingly I prefer to be bound not by the specific disclosures herein but only by the appended claims.

I claim:

1. A bus bar housing comprising a bus bar enclosure; a supporting frame therefor; said frame including means for supporting said bus bar enclosure and means for supporting a bus bar along the axis of said enclosure; said last mentioned means comprising a plurality of insulator supporting members on said frame; insulators supported thereby, each of said insulators engaging said bus bar and spacing it from the frame; each having a universally pivotal mounting at the end engaging the bus bar and an arcuately shaped member at the other end curved on an arc having the pivoting point of said universally pivotal mounting as a center; a member having a substantially plane surface carried by said frame; said surface being directed toward said bus bar and arranged substantially normal to said insulator, the curved surface of said arcuately shaped member bearing against said plane surface.

2. A bus bar housing comprising a bus bar enclosure; a supporting frame therefor; said frame including means for supporting said bus bar enclosure and means for supporting a bus bar along the axis of said enclosure; said last mentioned means comprising a plurality of insulator supporting members on said frame; insulators supported thereby, each of said insulators engaging said bus bar and spacing it from the frame; each having a universally pivotal mounting at the end engaging the bus bar and an arcuately shaped member at the other end curved on an arc having the pivoting point of said universally pivotal mounting as a center; a member having a substantially plane surface carried by said frame; said surface being directed toward said bus bar and arranged substantially normal to said insulator, the curved surface of said arcuately shaped member bearing against said plane surface, and means for adjusting said plane surface member toward and away from said bus bar to initially secure said insulator in position.

3. In combination, a bus bar, a housing for said bus bar comprising a tube of a substantially insulating material, metallic supporting means for said bus bar comprising a pair of metallic members constructed to be joined together to form a ring; insulators supported on said ring in angular displaced relation about said ring with respect to each insulator extending between said ring and bus bar; said supporting means and insulators positioning said bus bar substantially along the axis of said tube and spaced from the wall thereof; there being a plurality of said rings spaced from each other, each supporting opposite ends of said tube; additional means on each ring for supporting an end of said tube; an additional conductive member on each ring extending closer to said bus bar than the wall of said tube; said tube having a metallic lamination for placing the housing at ground potential, and an electrically conductive connection between said metallic lamination and said ring.

4. In combination, a bus bar, a housing for said bus bar comprising a tube of a substantially insulating material, metallic supporting means for said bus bar comprising a pair of metallic members constructed to be joined together to form a ring; insulators supported on said ring in angular displaced relation about said ring with respect to each insulator extending between said ring and bus bar; said supporting means and insulators positioning said bus bar substantially along the axis of said tube and spaced from the wall thereof; there being a plurality of said rings spaced from each other, each supporting opposite ends of said tube; additional means on each ring for supporting an end of said tube; said tube having a continuous metallic material embedded therein for placing the housing at ground potential.

5. In combination, a bus bar, a housing for said bus bar comprising a tube of a substantially insulating material, metallic supporting means for said bus bar comprising a pair of metallic members constructed to be joined together to form a ring; insulators supported on said ring in angular displaced relation about said ring with respect to each insulator extending between said ring and bus bar; said supporting means and insulators positioning said bus bar substantially along the axis of said tube and spaced from the wall thereof; there being a plurality of said rings spaced from each other, each supporting opposite ends of said tube; additional means on each ring for supporting an end of said tube; said tube having an inner and outer metallic lamination for grounding the bus bar housing and an electrically conductive connection between said tube and said ring.

6. In combination, a bus bar, a bus bar housing comprising an enclosure of insulating material, a supporting ring therefor, said ring including means for supporting said bus bar enclosure, pivotally mounted insulator means supported on said ring between said ring and said bus bar for supporting the latter along the axis of said enclosure; openings in said ring, and means for closing said openings; said last mentioned means comprising a flexible metallic strip secured at one end to a portion of said ring, the body of said strip being swingable into engagement with said ring over said openings; and means for releasably securing the opposite end of said strip to said ring.

7. In combination, a bus bar, a bus bar housing comprising an enclosure of insulation material, a supporting ring; said ring including means for supporting said bus bar enclosure, pivotally mounted insulator means supported on said ring between said ring and said bus bar for supporting the latter along the axis of said enclosure; openings in said ring, and means for closing said openings; said last mentioned means comprising a flexible metallic strip entirely surrounding said ring; said strip being removable from and replaceable on said ring over said openings; means for securing the ends of said strip together to tightly secure the same on said ring and ventilating holes in a portion of said strip.

8. In combination, a bus bar, a bus bar housing comprising a continuous integral tubular bus bar enclosure; a pair of metallic supporting members, each forming only a part of a complete ring and being joined together to form a ring and having flanges for supporting said enclosure, means for supporting said bus bar along the axis of said enclosure; said last mentioned means comprising a plurality of insulator supporting members angularly spaced from each other and supported on said ring; insulators supported thereby, each of said insulators engaging said bus bar and spacing it from the ring, each insulator having a universally pivotal mounting at the end engaging the bus bar and an arcuately shaped member at the other end curved on an arc having the pivoting point of said universally pivotal mounting as a center; said universally pivotal mounting comprising a socket member facing said bus bar, and a frustrum-conical member secured to said bus bar and pivoted in said socket.

*9. In a polyphase bus bar construction to be supported along structural members, a bus bar housing for said bus bar, a plurality of supporting members for said housing spaced longitudinally along said bus bar, each of said supporting members having an arcuate shaped portion extending over an arc of approximately 180° with its inner concave surface conforming to the curvature of the housing and forming a seat for said housing, said supporting member having a supporting portion extending substantially from said arcuate portion to said structural members, the line dividing the 180° arc coinciding with a line midway between said supporting portion, said housing extending at least from one side of said supporting members on the inner arcuate surface of said one of said supporting members to the next adjacent longitudinally spaced supporting member and a pair of linear elongated insulator members having one end of each secured to the arcuate supporting member so as to transmit forces thereto and having the other end engageable with the bus bar, said insulators being arranged on opposite sides of said dividing line and the axis of each insulator forming an angle of the order of but not less than 60° with said dividing line, said insulators transferring the forces set up in said bus to said structural members.*

WILLIAM M. SCOTT, JR.

References Cited in the file of this patent or the original patent

UNITED STATES PATENTS

| Number | Name | Date |
|---|---|---|
| 259,235 | Stieringer | June 6, 1882 |
| 452,725 | Williams | May 19, 1891 |
| 793,754 | Weber | July 4, 1905 |
| 848,047 | Procunier | Mar. 26, 1907 |
| 898,858 | Feldmann et al. | Sept. 15, 1908 |
| 1,939,552 | Hepner et al. | Dec. 12, 1933 |

(Other references on following page)

UNITED STATES PATENTS

| Number | Name | Date |
|---|---|---|
| 1,992,816 | De Mask | Feb. 26, 1935 |
| 2,044,580 | Leach | June 16, 1936 |
| 2,064,326 | Tietig | Dec. 15, 1936 |
| 2,158,868 | Stacy | May 16, 1939 |
| 2,181,664 | Melzer | Nov. 28, 1939 |
| 2,191,071 | Duttera | Feb. 20, 1940 |
| 2,229,006 | Rudd | Jan. 14, 1941 |
| 2,273,135 | Ohnesorge et al. | Feb. 17, 1942 |
| 2,275,203 | Rudd | Mar. 3, 1942 |

| Number | Name | Date |
|---|---|---|
| 2,293,310 | Rudd | Aug. 18, 1942 |
| 2,297,279 | Attwood | Sept. 29, 1942 |
| 2,313,972 | Rugg et al. | Mar. 16, 1943 |
| 2,335,543 | Rudd | Nov. 30, 1943 |
| 2,396,131 | Scott | Mar. 5, 1946 |
| 2,400,223 | Cole | May 14, 1946 |

FOREIGN PATENTS

| Number | Country | Date |
|---|---|---|
| 6,188 | Great Britain | of 1900 |